(12) United States Patent
Ohsaki

(10) Patent No.: US 8,788,179 B2
(45) Date of Patent: Jul. 22, 2014

(54) EMISSION DETERIORATION INFORMING DEVICE

(75) Inventor: Satoru Ohsaki, Chiryu (JP)

(73) Assignee: Denso Corporation, Kariya (JP)

( * ) Notice: Subject to any disclaimer, the term of this patent is extended or adjusted under 35 U.S.C. 154(b) by 600 days.

(21) Appl. No.: 13/180,777

(22) Filed: Jul. 12, 2011

(65) Prior Publication Data
US 2012/0016563 A1    Jan. 19, 2012

(30) Foreign Application Priority Data

Jul. 13, 2010    (JP) .................................. 2010-158441

(51) Int. Cl.
*F02D 41/40* (2006.01)
*F01N 11/00* (2006.01)
*F02D 28/00* (2006.01)
*F02D 45/00* (2006.01)
*F01N 3/20* (2006.01)

(52) U.S. Cl.
USPC .......................................................... 701/102

(58) Field of Classification Search
USPC .................. 701/102, 103, 105, 108, 109; 60/601–603
See application file for complete search history.

(56) References Cited

U.S. PATENT DOCUMENTS 7,219,002 B2 *   5/2007   Negishi et al. ................ 701/103
7,273,043 B2 *   9/2007   Okubo et al. ................. 123/431

FOREIGN PATENT DOCUMENTS

JP           10-9034      1/1998
JP         2006-283737   10/2006

* cited by examiner

*Primary Examiner* — Hieu T Vo
(74) *Attorney, Agent, or Firm* — Nixon & Vanderhye PC

(57) ABSTRACT

An emission deterioration informing device senses actual injection timing, at which fuel injection is actually performed from an injector. The device calculates a deviation amount of the sensed actual injection timing from target injection timing. The device has a warning light for informing deterioration of exhaust emission when the calculated deviation amount is larger than a predetermined threshold value. The device determines whether an operation state of an internal combustion engine is an impact state, in which the exhaust emission receives a predetermined influence or more from the deviation of the actual injection timing from the target injection timing. The device allows lighting of the warning light when the operation state is determined to be the impact state. The device prohibits the lighting of the warning light when the operation state is not determined to be the impact state.

18 Claims, 6 Drawing Sheets

EMISSION DETERIORATION INFORMING DEVICE

CROSS REFERENCE TO RELATED APPLICATION

This application is based on and incorporates herein by reference Japanese Patent Application No. 2010-158441 filed on Jul. 13, 2010.

BACKGROUND OF THE INVENTION

1. Field of the Invention

The present invention relates to an emission deterioration informing device that informs deterioration of exhaust emission.

2. Description of Related Art

Among spark ignition internal combustion engines, in a port injection internal combustion engine that injects fuel to an intake port, most part of the injected fuel adheres to an inner wall surface of the intake port once. Then, the fuel evaporates and is suctioned into a combustion chamber, in which the fuel combusts. Therefore, even if actual injection timing somewhat deviates from target timing, there is little or no influence on exhaust emission.

In contrast, in a direct injection internal combustion engine that injects the fuel directly into the combustion chamber, the exhaust emission deteriorates largely even if the actual injection timing deviates from the target injection timing only slightly (refer to Patent document 1 (JP-A-2006-283737)). Therefore, when a deviation amount of the actual injection timing from the target injection timing is large and exceeds a predetermined threshold value, it is required to inform a driver of the deterioration of the exhaust emission by operating an emission deterioration informing device such as a warning light.

However, depending on an operating state of the internal combustion engine, there is a case where the exhaust emission does not deteriorate largely even if the above-mentioned deviation amount is large. It is not appropriate to light the warning light also in such the case. It is preferable to restrict the lighting of the warning light to the necessary minimum.

SUMMARY OF THE INVENTION

It is an object of the present invention to provide an emission deterioration informing device capable of appropriately informing deterioration of exhaust emission.

It is assumed that an emission deterioration informing device according to the present invention is applied to a direct injection internal combustion engine, which injects fuel from an injector directly into a combustion chamber, among spark ignition internal combustion engines.

According to a first example aspect of the present invention, an emission deterioration informing device has an actual injection timing sensing section, a deviation amount calculating section, an emission deterioration informing section and an impact state determining section. The actual injection timing sensing section senses actual injection timing, at which the fuel injection is actually performed from the injector. The deviation amount calculating section calculates a deviation amount of the sensed actual injection timing from target injection timing. The emission deterioration informing section informs deterioration of exhaust emission when the calculated deviation amount is larger than a predetermined threshold value. The impact state determining section determines whether an operation state of the internal combustion engine is an impact state, in which the exhaust emission receives a predetermined influence or more from the deviation of the actual injection timing from the target injection timing. The emission deterioration informing device is configured to allow the information by the emission deterioration informing section when the operation state is determined to be the impact state. The emission deterioration informing device is configured to prohibit the information by the emission deterioration informing section when the operation state is not determined to be the impact state.

Here, the impact state is defined as the operation state of the internal combustion engine, in which the exhaust emission receives a predetermined influence or more from the deviation of the actual injection timing from the target injection timing. If the operation state of the internal combustion engine is not the impact state, the exhaust emission does not deteriorate beyond a permissible range even when the deviation amount of the actual injection timing from the target injection timing is large and exceeds the predetermined threshold value. Therefore, according to the above-described aspect of the present invention paying an attention to this point, the information by the emission deterioration informing section is prohibited during the non-impact state even if the deviation amount is large and exceeds the predetermined threshold value. During the impact state, the exhaust emission deterioration is informed if the deviation amount is large and exceeds the predetermined threshold value. Thus, the deterioration of the exhaust emission can be informed appropriately.

According to a second example aspect of the present invention, an emission deterioration informing device has an actual injection timing sensing section, a deviation amount calculating section, an emission deterioration informing section and an impact state determining section. The actual injection timing sensing section senses actual injection timing, at which the fuel injection is actually performed from the injector. The deviation amount calculating section calculates a deviation amount of the sensed actual injection timing from target injection timing. The emission deterioration informing section informs deterioration of exhaust emission when the deviation amount is larger than a predetermined threshold value. The impact state determining section determines whether an operation state of the internal combustion engine is an impact state, in which the exhaust emission receives a predetermined influence or more from the deviation of the actual injection timing from the target injection timing. The emission deterioration informing device is configured to set the threshold value at a larger value in the case where the operation state is not determined to be the impact state than in the case where the operation state is determined to be the impact state.

Even if the deviation amount of the actual injection timing from the target injection timing is the same, whether the exhaust emission deteriorates beyond the permissible range or not differs depending on whether the operation state of the internal combustion engine is the impact state or the non-impact state. According to the above-described aspect of the present invention paying an attention to this point, the threshold value used for determining whether the exhaust emission has deteriorated is set at a larger value in the case of the non-impact state than in the case of the impact state. Accordingly, even if the deviation amount is the same, the information by the emission deterioration informing section becomes less likely to be made during the non-impact state. Thus, the deterioration of the exhaust emission can be informed appropriately such that the unnecessary information of the emission deterioration is suppressed and the information is restricted to the necessary minimum.

According to a third example aspect of the present invention, an emission deterioration informing device has an actual injection time number sensing section, an emission deterioration informing section and an impact state determining section. The actual injection time number sensing section senses an actual injection time number of split injections when the fuel injection in a combustion cycle of the internal combustion engine is performed as a plurality of split injections. The emission deterioration informing section informs deterioration of exhaust emission when the sensed actual injection time number is smaller than a target injection time number. The impact state determining section determines whether an operation state of the internal combustion engine is an impact state, in which the exhaust emission receives a predetermined influence or more because the actual injection time number is smaller than the target injection time number. The emission deterioration informing device is configured to allow the information by the emission deterioration informing section when the operation state is determined to be the impact state. The emission deterioration informing device is configured to prohibit the information by the emission deterioration informing section when the operation state is not determined to be the impact state.

Here, the impact state is defined as the operation state of the internal combustion engine, in which the exhaust emission receives a predetermined influence or more because the actual injection time number is smaller than the target injection time number. If the operation state of the internal combustion engine is not the impact state, the exhaust emission does not deteriorate beyond a permissible range even when the actual injection time number is smaller than the target injection time number. According to the above-described aspect of the present invention paying an attention to this point, the information by the emission deterioration informing section is prohibited during the non-impact state even if the actual injection time number is smaller than the target injection time number. The exhaust emission deterioration is informed if the actual injection time number is smaller than the target injection time number during the impact state. Thus, the deterioration of the exhaust emission can be informed appropriately.

According to a fourth example aspect of the present invention, the impact state determining section determines that the operation state is the impact state on a condition that fuel is injected during a compression stroke of the internal combustion engine.

A common direct injection internal combustion engine switches between stratified charge combustion and homogeneous combustion. In the stratified charge combustion, fuel is injected during a compression stroke to provide a richer air-fuel ratio of a mixture gas near an ignition plug than an air-fuel ratio of a mixture gas in the other part. In the homogeneous combustion, the fuel is injected during an intake stroke to provide a uniform air-fuel ratio in the entire combustion chamber. A combustion state changes largely even if fuel injection timing deviates only slightly from target injection timing in the stratified charge combustion. That is, it can be said that the operation state controlling the internal combustion engine to inject the fuel during the compression stroke and to perform the stratified charge combustion is an impact state, in which the exhaust emission receives a predetermined influence or more from the deviation of the actual injection timing from the target injection timing. According to the above-described aspect of the present invention taking this point into account, the operation state is determined to be the impact state on the condition that the fuel is injected during the compression stroke. Therefore, whether the operation state is the impact state or not can be determined accurately. Accordingly, the deterioration of the exhaust emission can be informed appropriately.

According to a fifth example aspect of the present invention, the impact state determining section determines that the operation state is the impact state on a condition that temperature of a cylinder of the internal combustion engine is lower than a predetermined temperature. It may be determined that the cylinder temperature is lower than the predetermined temperature when coolant temperature of the internal combustion engine is lower than predetermined temperature or when a predetermined time has not elapsed yet since the internal combustion engine is started, for example.

When the internal combustion engine is operated in a low-temperature state in which the cylinder temperature is lower than the predetermined temperature, the combustion state changes largely even if the fuel injection timing deviates from the target injection timing only slightly. According to the above-described aspect of the present invention taking this point into account, the operation state is determined to be the impact state on the condition that the cylinder temperature is lower than the predetermined temperature. Therefore, whether the operation state is the impact state or not can be determined accurately. Accordingly, the deterioration of the exhaust emission can be informed appropriately.

According to a sixth example aspect of the present invention, the emission deterioration informing device is applied to the internal combustion engine having a catalytic device for purifying exhaust gas. The impact state determining section determines that the operation state is the impact state on a condition that temperature of the catalytic device has not reached catalyst activation temperature and catalyst warm-up operation is being performed.

When the catalyst warm-up operation is being performed, the exhaust gas cannot be purified sufficiently, Therefore, the exhaust emission deteriorates largely even if the fuel injection timing deviates from the target injection timing only slightly. According to the above-described aspect of the present invention taking this point into account, the operation state is determined to be the impact state on the condition that the catalyst warm-up operation is being performed. Therefore, whether the operation state is the impact state or not can be determined accurately. Accordingly, the deterioration of the exhaust emission can be informed appropriately.

According to a seventh or eighth example aspect of the present invention, the emission deterioration informing device is applied to a fuel injection system having an injection commanding section for outputting an injection command signal corresponding to target injection quantity and target injection timing and a drive circuit for controlling a drive voltage or a drive current supplied to the injector based on the injection command signal. The actual injection timing sensing section (or actual injection time number sensing section) senses the actual injection timing (or actual injection time number) based on the drive voltage or the drive current controlled by the drive circuit.

If a lift sensor for sensing a lift amount of a valve member that opens and closes an injection hole of the injector is provided, the actual injection timing and the actual injection time number can be sensed based on the sensed lift amount. However, a cost will increase since the lift sensor is necessary. The actual injection timing and the actual injection time number can be sensed based on the injection command signal outputted from the injection commanding section. However, if the control state of the drive voltage or the drive current does not correspond to the injection command signal because of existence of an abnormality in the drive circuit or the like, the actual injection timing and the actual injection time number cannot be sensed correctly.

According to the above-described aspect of the present invention taking these points into account, the actual injection timing or the actual injection time number is sensed based on the drive voltage or the drive current supplied to the injector. Therefore, the lift sensor can be made unnecessary, and the actual injection timing or the actual injection time number can be sensed correctly even when the abnormality occurs in the drive circuit.

According to a ninth example aspect of the present invention, the emission deterioration informing device is applied to a fuel injection system having an injection commanding section for outputting an injection command signal corresponding to target injection quantity and target injection timing and a drive circuit for controlling a drive voltage or a drive current supplied to the injector based on the injection command signal. The emission deterioration informing device is configured to prohibit the information by the emission deterioration informing section when temperature of an electronic component constituting the injection commanding section or an electronic component constituting the drive circuit is outside an operation-guaranteed temperature range.

When the temperature of the above-mentioned electronic component is outside the operation-guaranteed temperature range, there is a concern that the actual injection timing or the actual injection time number cannot be sensed with high accuracy and the emission deterioration is informed erroneously. Therefore, as in the above-described aspect of the present invention, the information should be preferably prohibited when the temperature of the electronic component is outside the operation-guaranteed temperature range, thereby preventing the erroneous information of the emission deterioration.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
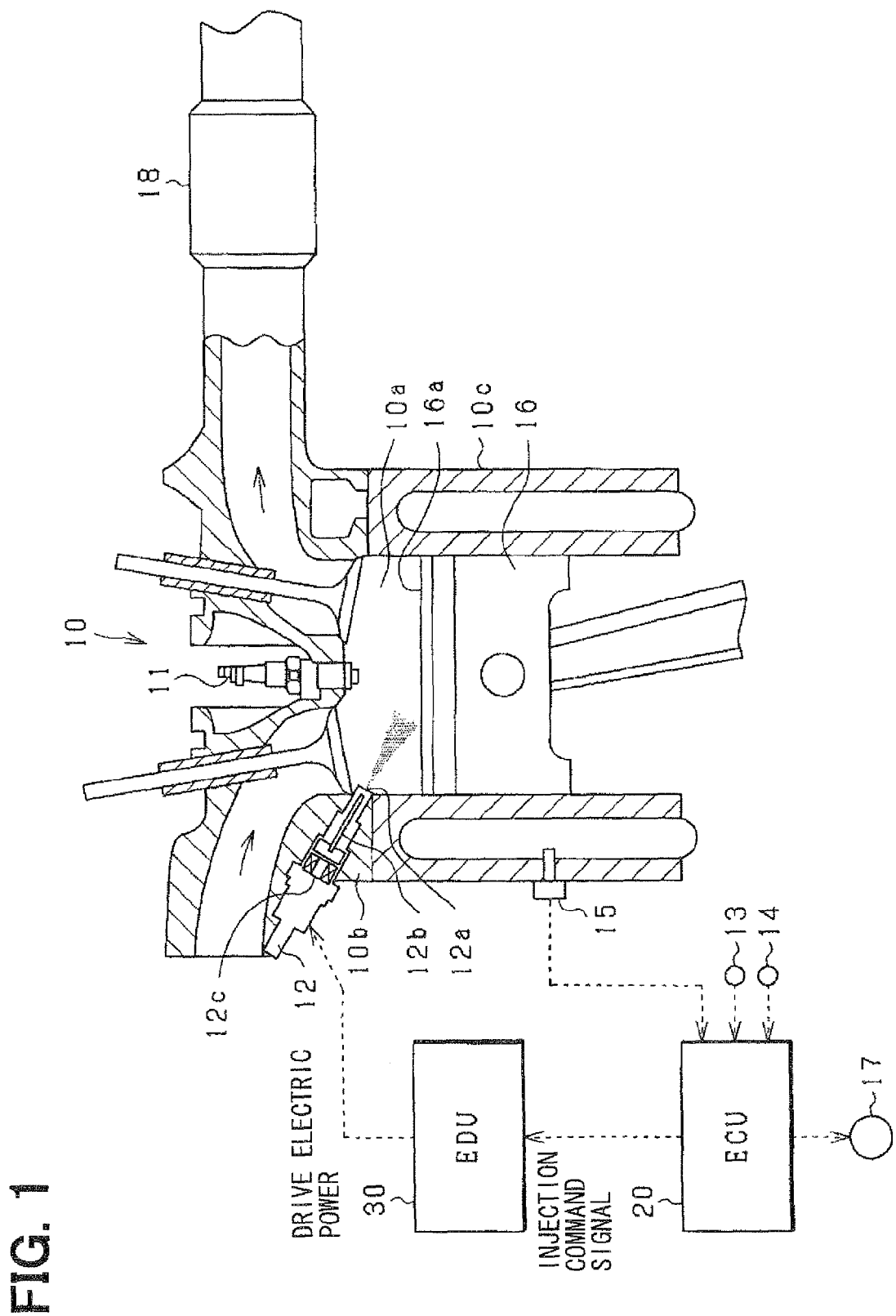
FIG. 1 is a diagram showing an internal combustion engine and a fuel injection system using an emission deterioration informing device according to a first embodiment of the present invention.

Hereafter, embodiments of the present invention will be described with reference to the drawings. In the following description of the respective embodiments, the same sign is used in the drawings for identical or equivalent parts. Explanation of such the part in one embodiment may be incorporated in the description of the other embodiments.

(First Embodiment)

Hereinafter, a first embodiment of the present invention will be described. FIG. 1 is a diagram showing an internal combustion engine 10 and a fuel injection system, to which an emission deterioration informing device according to the present embodiment is applied. This internal combustion engine 10 is mounted to a vehicle and functions as a driving source of running. The internal combustion engine 10 is a spark ignition internal combustion engine having a spark plug 11 and is a direct injection internal combustion engine that injects fuel directly into a combustion chamber 10a. In an example shown in FIG. 1, an injector 12 for injecting the fuel is fixed to a cylinder block 10b of the internal combustion engine 10. An operation of the injector 12 is controlled by an injection command signal outputted from a control unit 20 (ECU) through a drive unit 30 (EDU).

The injector 12 has a needle valve 12b (valve member) for opening and closing an injection hole 12a, an electromagnetic solenoid 12c for causing opening and closing operation of the needle valve 12b and the like. If a drive electric power controlled by the EDU 30 is supplied to the electromagnetic solenoid 12c, the needle valve 12b performs valve-opening operation, whereby the fuel is injected from the injection hole 12a. If the supply of the drive electric power is stopped, the needle valve 12b performs valve-closing operation, whereby the fuel injection from the injection hole 12a stops. Therefore, valve opening timing of the injection hole 12a is controlled by controlling supply start timing of the drive electric power, whereby injection start timing can be controlled. A valve opening time of the injection hole 12a is controlled by controlling a supply time of the drive electric power, whereby injection quantity can be controlled.

The injector 12 is arranged such that the injection hole 12a is exposed to the combustion chamber 10a. Although not shown in the drawings, fuel in a fuel tank is pumped to a pressure accumulation vessel (delivery pipe) by a high-pressure pump. The high-pressure fuel accumulated in the pressure accumulation vessel is distributed and supplied to the injectors 12 of respective cylinders.

Next, a fuel injection control device that controls the operation of the injector 12, i.e., the ECU 20 (injection commanding section) and the EDU 30 (drive circuit) that control an electric power supply state to the electromagnetic solenoid 12c, will be explained.

The ECU 20 receives inputs of sensing values of various sensors such as a crank angle sensor 13 for sensing a crank angle, an airflow meter 14 for sensing intake air quantity, and a coolant temperature sensor 15 for sensing temperature of a coolant that cools the internal combustion engine 10. The ECU 20 calculates engine rotation speed based on the sensing value of the crank angle sensor 13 and calculates an engine load based on the sensing value of the airflow meter 14. The ECU 20 calculates ignition timing of the spark plug 11 and target injection quantity and target injection timing of the fuel based on the rotation speed, the load and the coolant temperature sensed with the coolant temperature sensor 15. The ECU 20 outputs the injection command signal, which is set to achieve the calculated target injection quantity and target injection timing, to the EDU 30. If CPU 21 of the ECU 20 shown in FIG. 2 commands pulse-on generation to a pulse output circuit 22, a pulse of the injection command signal is outputted from the pulse output circuit 22 at the timing of the command.

Further, the ECU 20 switches combustion between stratified charge combustion and homogeneous combustion based on the engine rotation speed and the engine load. For example, in an operation range of low rotation speed and low load such as idling or running in an urban area, the ECU 20 switches the combustion to the stratified charge combustion at a lean air-fuel ratio (for example, 17 to 50) to improve fuel consumption. In an operation range of high rotation speed and high load such as high-speed running, acceleration running or hill-climbing running, the ECU 20 switches the combustion to the homogenous combustion at an air-fuel ratio equal to or close to a stoichiometric air-fuel ratio (for example, 12 to 15) to improve an engine output.

In the stratified charge combustion, the fuel is injected in a latter half of a compression stroke, in which a piston 16 ascends. Thus, a mixture gas containing the injected fuel is collected as a dense mixture gas near the spark plug 11 along a shape of a piston top surface 16a. In the homogenous combustion, the fuel is injected in an intake stroke, in which the piston 16 descends. Thus, the sprayed fuel is agitated in the combustion chamber 10a during the compression stroke and becomes a homogenous mixture gas.

In such the direct injection engine, there is a concern that the injected fuel adheres to an inner wall surface of a cylinder 10c or the piston top surface 16a. If the adhered fuel does not vaporize by the ignition timing, the adhered fuel causes incomplete combustion, thereby causing problems of exhaust emission deterioration such as significant increase of a generation amount of PM (particulate matters). Therefore, according to the present embodiment, specifically during the stratified charge combustion control, the above-mentioned target injection quantity is split and injected in multiple times of split injections during a single combustion cycle. With such the scheme, the injection quantity of each injection reduces, so a penetration force of the injection can be reduced. Accordingly, the adhesion of the fuel to the inner wall surface of the cylinder 10c or the piston top surface 16a can be inhibited, and the exhaust emission deterioration can be suppressed. First injection start timing of the split injection may be set at the above-mentioned target injection timing, and second injection may be started immediately after an end of the first injection.

Figure 2:
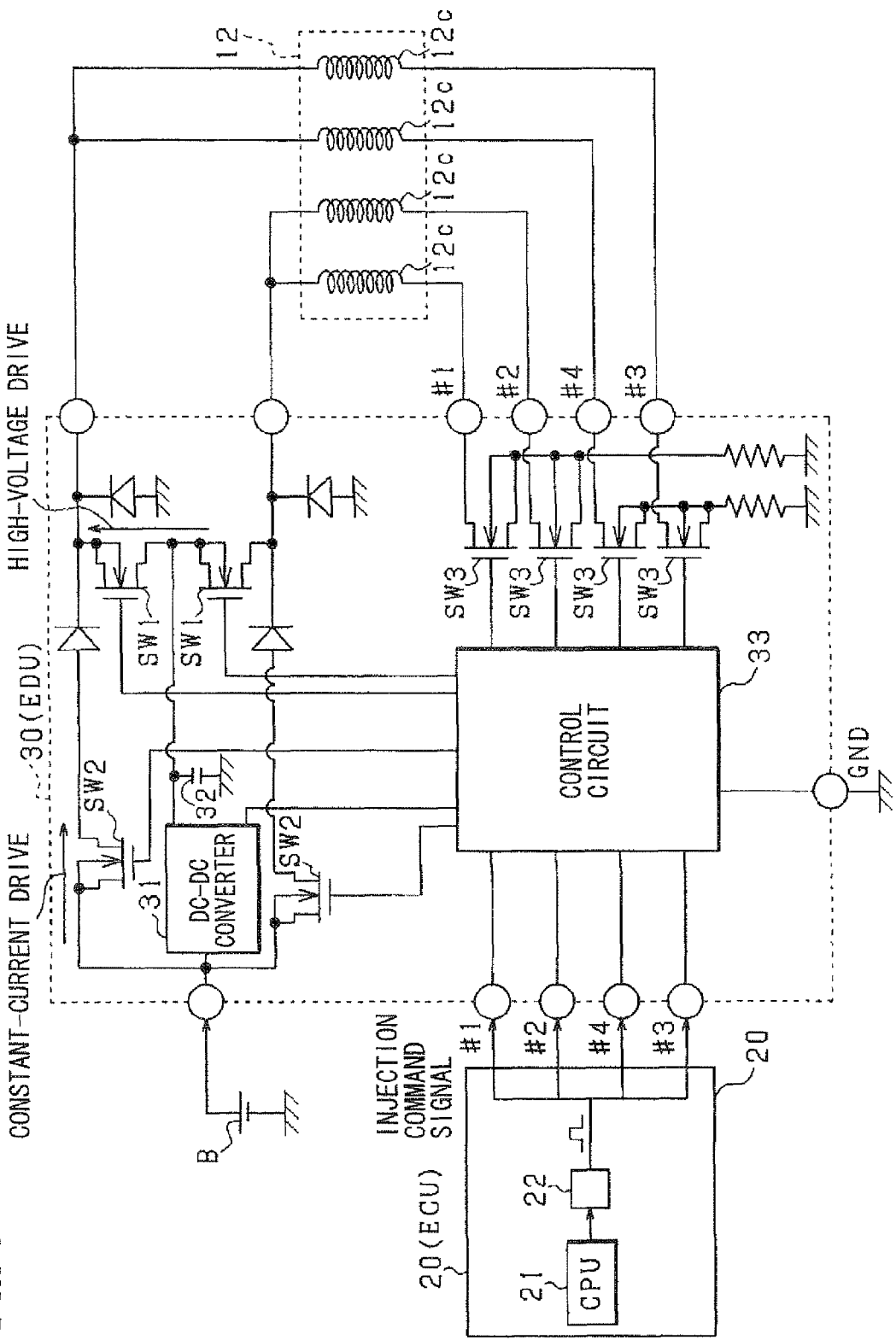
FIG. 2 is a diagram showing circuit configurations of EDU and ECU according to the first embodiment.

Next, a construction of the EDU 30 will be described with reference to FIG. 2. The EDU 30 is a unitized device having a high voltage generation circuit 31, 32 for generating a high voltage by boosting a voltage of a battery B mounted in the vehicle and a switching device for supplying the generated high-voltage electric power to the injector 12 (electromagnetic solenoid 12c) based on the injection command signal.

The high voltage generation circuit 31, 32 includes a DC-DC converter 31 for boosting the voltage (12V) of the in-vehicle battery B and a boosting capacitor 32 for charging (storing) the high-voltage electric power boosted by the DC-DC converter 31. The switching device has multiple switching elements SW1, SW2, SW3, which perform ON/OFF operation according to the injection command signal from the ECU 20. The switching device controls the electric power supply state to the electromagnetic solenoid 12c of the injector 12. That is, the switching device controls switching among the supply of the high-voltage electric power charged to the boosting capacitor 32, the supply of the low-voltage electric power supplied by the in-vehicle battery B, and the supply of none of the electric powers to the electromagnetic solenoid 12c.

Further, the EDU 30 has a control circuit 33 for outputting switch command signals corresponding to the injection command signal from the ECU 20 to respective gates of the switching elements SW1, SW2, SW3. The switching elements SW1, SW2, SW3 operate according to the switch command signals. By the operation of the switching elements SW3, it is selected which of the electromagnetic solenoids 12c of the respective cylinders is energized. That is, the injector 12 corresponding to the switching element SW3, which has performed the ON-operation, is enabled to inject.

By the operations of the switching elements SW1, SW2, the power supply is switched between the supply of the high-voltage electric power from the boosting capacitor 32 and the supply of the low-voltage electric power from the in-vehicle battery B. For example, when the low-voltage electric power is supplied, the ON-operation of the switching element SW2 is performed and the OFF-operation of the switching element SW1 is performed. When the high-voltage electric power is supplied, the ON-operation of the switching element SW1 is performed and the OFF-operation of the switching element SW2 is performed. While the OFF-operation of the switching element SW1 is performed, the high-voltage electric power from the DC-DC converter 31 is charged to the boosting capacitor 32. While the ON-operation of the switching element SW1 is performed, the electric power charged to the boosting capacitor 32 can be discharged to the electromagnetic solenoid 12c.

Next, an operation mode of the ECU 20 and the EDU 30 in the case where the opening and closing operation of the needle valve 12b is performed only once will be explained with reference to FIG. 3.

Figure 3:
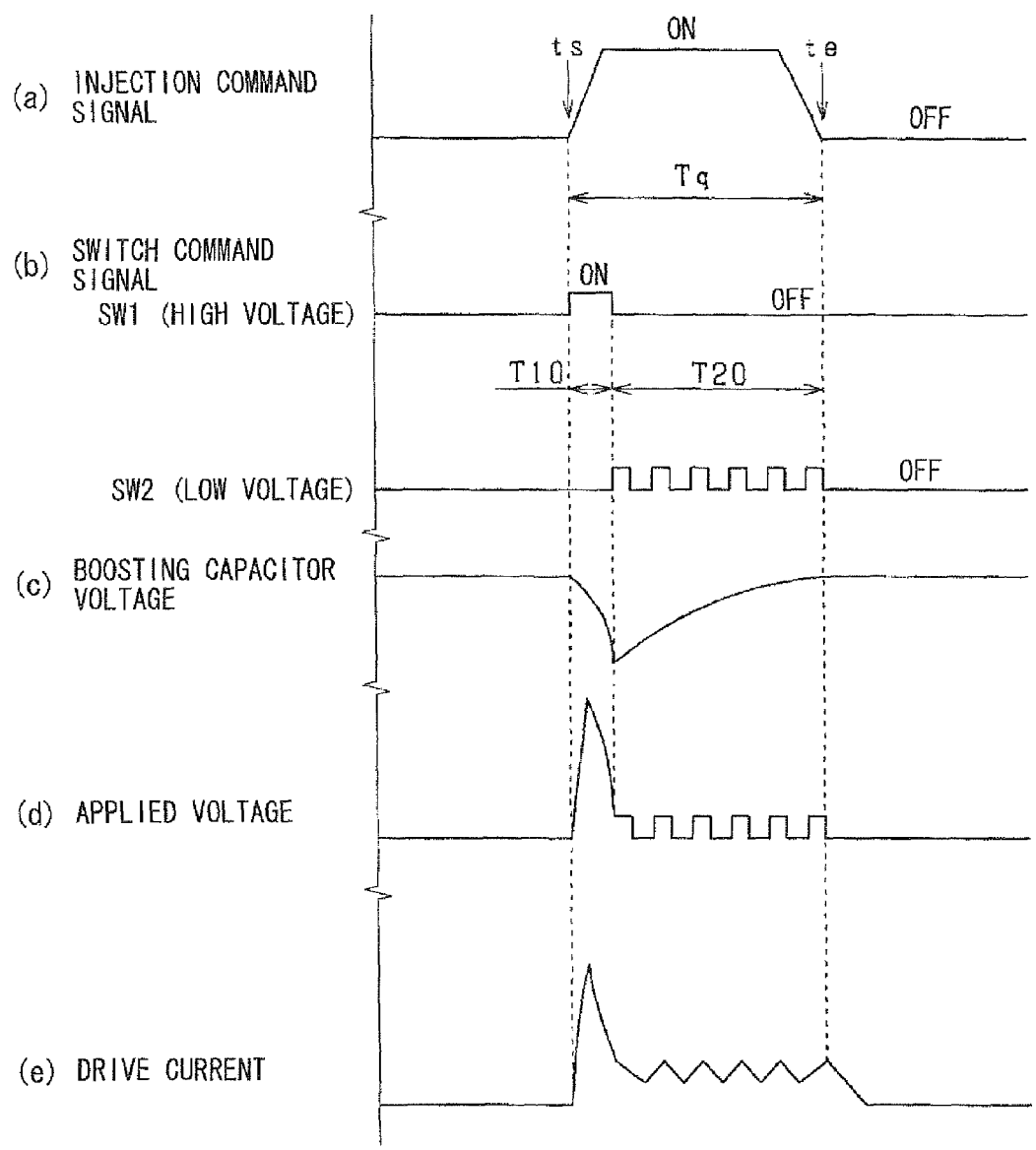
FIG. 3 is a diagram showing an operation mode of the ECU and the EDU according to the first embodiment.

Part (a) of FIG. 3 shows the injection command signal outputted from the ECU 20 to the EDU 30. The injection is performed during an ON-period of the signal, and the injection is stopped during an OFF-period of the signal. Part (b) of FIG. 3 shows operating states of the switching elements SW1, SW2. The high-voltage electric power is supplied to the electromagnetic solenoid 12c of the injector 12 during an ON-period of the switching element SW1. The low-voltage electric power is supplied to the electromagnetic solenoid 12c during an ON-period of the switching element SW2. Part (c) of FIG. 3 shows a voltage change (charge state) of the boosting capacitor 32. Part (d) of FIG. 3 shows a change of the voltage applied to the electromagnetic solenoid 12c. Part (e) of FIG. 3 shows a change of a drive current flowing through the electromagnetic solenoid 12c.

If the injection start is commanded by the injection command signal (refer to "ts" in part (a) of FIG. 3), first, the switching element SW1 is switched on once (refer to part (b) of FIG. 3). Thus, electric discharge from the boosting capacitor 32 to the electromagnetic solenoid 12c is performed (refer to part (c) of FIG. 3). Thus, the high-voltage electric power is supplied to the electromagnetic solenoid 12c, whereby the applied voltage rises sharply and the drive current rises sharply (refer to sign T10). As a result, the needle valve 12b starts the valve-opening operation.

After the high-voltage electric power is supplied by the ON-operation of the switching element SW1 as described above, the switching element SW1 is caused to perform the OFF-operation and the switching element SW2 is caused to perform the ON-operation. Thus, the low-voltage electric power is supplied to the electromagnetic solenoid 12c. In this low-voltage electric power supply, ON-OFF switching operation of the switching element SW2 is repeated multiple times (refer to part (b) of FIG. 3). Thus, the low-voltage electric power is repeatedly supplied and a constant drive current (i.e., constant current) flows from the in-vehicle battery B to the electromagnetic solenoid 12c (refer to T20). As a result, the needle valve 12b having lifted to the maximum lift position due to the high-voltage electric power supply maintains the lift position.

Thereafter, if the injection stop is commanded by the injection command signal (refer to sign "te"), the OFF-operation of the both switching elements SW1, SW2 is performed (refer to part (b) of FIG. 3). Thus, the electric power supply to the electromagnetic solenoid 12c is stopped (refer to parts (d), (e) of FIG. 3), so the needle valve 12b starts the valve-closing operation (i.e., lift down). Thus, by switching on and off the injection command once, single opening-closing operation of the needle valve 12b is completed.

As mentioned above, the fuel adhesion is inhibited by splitting the target injection quantity and by injecting the split target injection quantity through the multiple times of the split injections during the single combustion cycle. However, there is a limit to the reduction of the injection quantity of each injection. Therefore, the splitting number is set such that the injection quantity of each injection does not fall below lower limit quantity. That is, the splitting number is set as large as possible within a range where each injection signal ON-time Tq (refer to part (a) of FIG. 3) does not become shorter than a lower limit time. The time number of the high-voltage drive using the boosting capacitor 32 increases as the splitting number increases. Therefore, the splitting number is set as large as possible within a range where a sufficient charging time of the boosting capacitor 32 can be secured. In consideration of these points, the ECU 20 sets as large a target time number of the splitting (i.e., target injection time number) as possible within a condition range of the lower limit injection quantity and the charging time based on the engine rotation speed.

Next, an emission deterioration informing device as a substantial portion of the present embodiment will be explained.

The above-mentioned target injection timing calculated by the ECU 20 is calculated as the timing optimized such that the exhaust emission becomes smaller than an upper limit value (regulation value). Therefore, if the actual injection timing deviates largely from the target injection timing, there is a case where the exhaust emission increases and exceeds the upper limit value. Therefore, when the deviation amount of the actual injection timing from the target injection timing is large and exceeds a predetermined threshold value TH, the ECU 20 determines existence of an emission deterioration state, in which the exhaust emission has deteriorated. In this case, the ECU 20 performs control to light a warning light 17 (emission deterioration informing section) shown in FIG. 1. The lighting of the warning light 17 informs a vehicle driver of the existence of the emission deterioration state.

The exhaust emission is significantly affected by the injection timing deviation during the stratified charge combustion control for injecting the fuel during the compression stroke. Therefore, the emission deterioration state occurs even if the injection timing deviation occurs only slightly. In contrast, in the homogenous combustion control for injecting the fuel in the intake stroke, the exhaust emission is not affected largely by the injection timing deviation. Therefore, the emission deterioration state does not occur even if the above-mentioned deviation amount increases and exceeds the threshold value TH. Therefore, in the present embodiment, it is regarded that the operation state of the internal combustion engine 10 is an impact state, in which the exhaust emission receives a predetermined influence or more from the injection timing deviation, and the lighting of the warning light 17 is allowed during the stratified charge combustion control. However, during the homogenous combustion control, the lighting of the warning light 17 is prohibited even if the above-mentioned deviation amount is large and exceeds the threshold value TH.

Concerning the above-mentioned impact state, for example, an increase amount of a specific component in the exhaust gas (e.g., PM, NOx, HC or CO), which occurs when the actual injection timing is deviated from the target injection timing by a predetermined amount, may be measured for each of various operation states of the internal combustion engine 10 beforehand. The operation state, in which the above-mentioned increase amount becomes equal to or larger than a predetermined amount, may be regarded as the impact state, in which the exhaust emission receives the predetermined influence or more from the injection timing deviation. The operation state providing the impact state may be obtained by examination beforehand.

Figure 4:
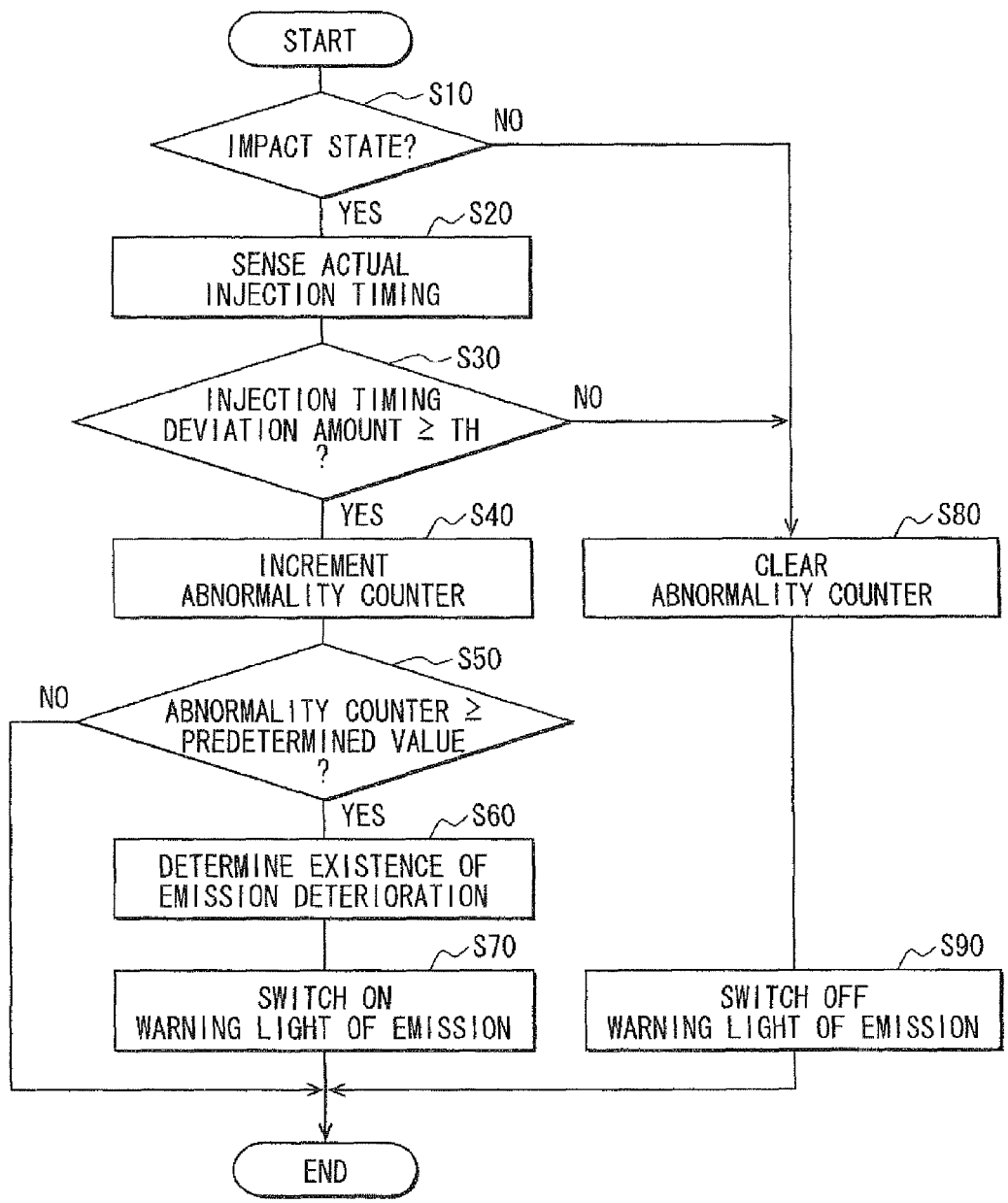
FIG. 4 is a flowchart showing a control procedure of a warning light of emission according to the first embodiment.

FIG. 4 is a flowchart showing a procedure for controlling the operation of the warning light 17 performed by a microcomputer of the ECU 20. The processing is repeatedly performed in a predetermined cycle (e.g., computation cycle of CPU).

First in S10 (S means "Step") (impact state determining section) shown in FIG. 4, it is determined whether the operation state of the internal combustion engine 10 is the above-mentioned impact state. That is, it is determined that the operation state is the impact state during the stratified charge combustion control. It is determined that the operation state of the engine 10 is a non-impact state during the homogenous combustion control. Also, when temperature of the cylinder 10c is low, the influence of the injection timing deviation over the exhaust emission deterioration is large. Therefore, it may be determined that the operation state is the impact state when a low-temperature state, in which the cylinder temperature is lower than predetermined temperature, exists. Alternatively, it may be determined that the operation state is the impact state when both of the condition that the low temperature state exists and the condition that the stratified charge combustion control is being performed are satisfied. Alternatively, it may be determined that the operation state is the impact state when at least one of the above-mentioned two conditions is satisfied.

The existence/nonexistence of the low-temperature state may be determined based on the coolant temperature sensed with the coolant temperature sensor 15. Alternatively, it may be determined that the low-temperature state exists when an elapsed time after the internal combustion engine 10 is started is shorter than a predetermined time. Alternatively, it may be determined that the low-temperature state exists when warm-up operation is being performed before temperature of a catalyst (not shown) reaches a predetermined temperature (actuation temperature).

A catalytic device 18, in which a catalyst for purifying a specific component in the exhaust gas (e.g., HC, CO or NOx) is supported, is attached to an exhaust pipe of the internal combustion engine 10. It may be determined in 510 that the operation state is the impact state when catalyst warm-up operation is being performed before the catalyst of the catalytic device 18 reaches activation temperature. It may be determined whether the catalyst warm-up operation is being performed based on exhaust temperature sensed with an exhaust temperature sensor (not shown).

If it is determined in S10 that the operation state is the impact state (S10: YES), the process proceeds to S20 (actual injection timing sensing section). In S20, the actual injection timing is sensed based on the drive voltage or the drive current outputted from the EDU 30. More specifically, rising timing of the drive voltage at a connection between the electromagnetic solenoid 12c and the switching element SW3 (corresponding to voltage shown in part (d) of FIG. 3) is sensed as the actual injection timing. Alternatively, rising timing of the value of the drive current flowing through the electromagnetic solenoid 12c (corresponding to current shown in part (e) of FIG. 3) is sensed as the actual injection timing. Alternatively, the timing, at which the switch command signal is outputted from the control circuit 33 to cause the switching element SW1 to perform the ON-operation, is sensed as the actual injection timing.

Alternatively, the actual injection timing may be sensed based on the injection command signal outputted from the ECU 20. More specifically, the timing, at which the injection command signal is outputted from the pulse output circuit 22, is sensed as the actual injection timing. Alternatively, the timing, at which the injection command signal is inputted to the control circuit 33, is sensed as the actual injection timing.

Alternatively, a fuel pressure sensor may be provided to the pressure accumulation vessel, and timing, at which fuel pressure sensed with the fuel pressure sensor starts decreasing, may be sensed as the actual injection timing. In this case, it is desirable to sense the actual injection timing in a state where fuel discharge from the high-pressure pump to the pressure accumulation vessel is stopped or reduced in amount. With such the scheme, the fuel pressure sensed with the fuel pressure sensor becomes less affected by the fuel discharge from the high-pressure pump. Therefore, the timing of the start of the fuel pressure decrease occurring with the fuel injection start can be sensed with high accuracy.

Alternatively, a lift sensor (not shown) for sensing a lift amount of the needle valve 12b may be provided, and lift-up start timing obtained based on a sensing value of the lift sensor may be sensed as the actual injection timing.

In following S30 (deviation amount calculating section), a deviation amount (injection timing deviation amount) of the actual injection timing sensed in S20 from the above-mentioned target injection timing is calculated. Further, it is determined whether the calculated injection timing deviation amount is "equal to or larger than" a predetermined threshold value TH. Each time it is determined that the injection timing deviation amount ≥TH (S30: YES), an abnormality counter is incremented by one in following S40. If it is determined in following S50 that the abnormality counter is equal to or larger than a predetermined value, it is determined in following S60 that the above-mentioned emission deterioration state exists. In following S70, the operation of the warning light 17 is controlled to light the warning light 17. That is, the existence of the emission deterioration state is determined on the condition that the state where the injection timing deviation amount ≥TH continues for a predetermined time or longer.

If it is determined that the operation state is the non-impact state in S10 (S10: NO) or it is determined that the injection timing deviation amount <TH (S30: NO), the value of the abnormality counter is reset to zero in following S80. Further, in following S90, the operation of the warning light 17 is controlled to switch off the warning light 17.

Thus, according to the present embodiment, when the operation state is the non-impact state (S10: NO), the lighting of the warning light 17 is prohibited (S90) irrespective of whether the injection timing deviation amount exceeds the threshold value TH. When the operation state is the impact state (S10: YES), the warning light 17 is lit (S70) on the condition that the injection timing deviation amount exceeds the threshold value TH. Thus, the deterioration of the exhaust emission can be informed appropriately.

(Second Embodiment)

Next, a second embodiment of the present invention will be described. In the above-described first embodiment, it is determined whether the operation state is the impact state based on the deviation amount of the actual injection timing from the target injection timing. In the second embodiment, it is determined whether the operation state is the impact state based on deviation of the actual injection time number of the above-mentioned split injections from the target injection time number of the split injections.

Figure 5:
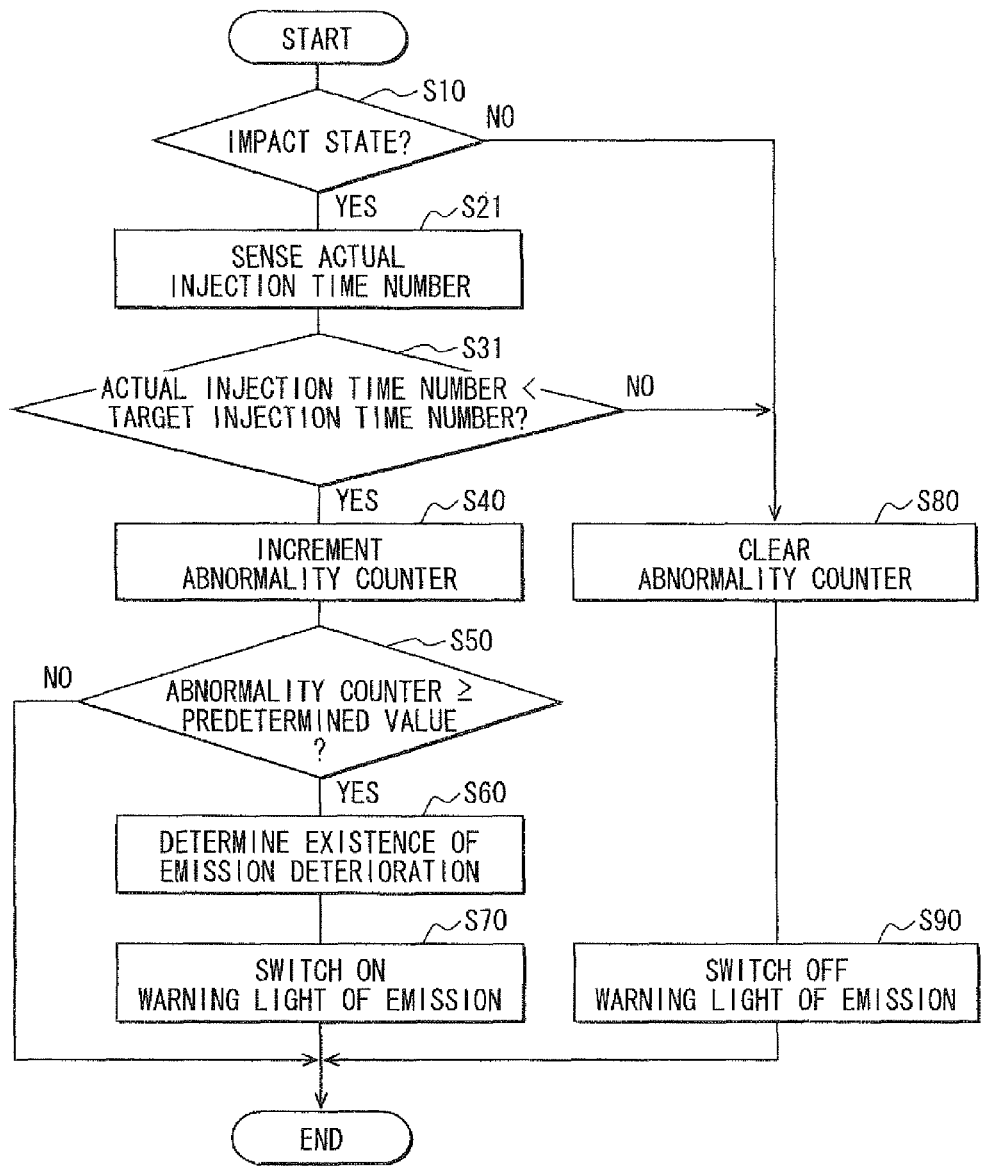
FIG. 5 is a flowchart showing a control procedure of a warning light of emission according to a second embodiment of the present invention.

FIG. 5 is a flowchart showing a procedure for controlling the operation of the warning light 17 according to the present embodiment. In short, S20 and S30 of FIG. 4 are changed into S21 and S31 of FIG. 5. That is, in S21, the actual injection time number is sensed based on the drive voltage or the drive current outputted from the EDU 30. More specifically, the time number of rising of the voltage at the connection between the electromagnetic solenoid 12c and the switching element SW3 (corresponding to voltage shown in part (d) of FIG. 3) from zero per combustion cycle is sensed as the actual injection time number. Alternatively, the time number of rising of the current value flowing through the electromagnetic solenoid 12c (corresponding to current shown in part (e) of FIG. 3) from zero per combustion cycle is sensed as the actual injection time number. Alternatively, the time number of the output of the switch command signal from the control circuit 33 for causing the switching element SW1 to perform the ON-operation per combustion cycle is sensed as the actual injection time number.

Alternatively, the actual injection time number may be sensed based on the injection command signal outputted from the ECU 20. More specifically, the time number of the output of the injection command signal from the pulse output circuit 22 per combustion cycle may be sensed as the actual injection time number. Alternatively, the time number of the input of the injection command signal to the control circuit 33 per combustion cycle may be sensed as the actual injection time number.

Alternatively, a fuel pressure sensor may be provided to the pressure accumulation vessel, and the time number of start of decrease of fuel pressure sensed with the fuel pressure sensor per combustion cycle may be sensed as the actual injection time number. Alternatively, a lift sensor (not shown) for sensing the lift amount of the needle valve 12b may be provided, and the time number of lift-up start per combustion cycle obtained based on a sensing value of the lift sensor may be sensed as the actual injection time number.

In following S31 (actual injection time number sensing section), it is determined whether the actual injection time number sensed in S21 is smaller than the above-mentioned target injection time number. Each time it is determined that the actual injection time number <the target injection time number (S31: YES), the abnormality counter is incremented by one in following S40.

If the actual injection time number is smaller than the target injection time number, there is a case where the exhaust emission increases and exceeds the upper limit value. Therefore, when the actual injection time number is smaller than the target injection time number, the ECU 20 determines that the emission deterioration state exists and controls the warning light 17 to light (S70). Thus, the ECU 20 informs the vehicle driver of the existence of the emission deterioration state.

If the operation state is the above-mentioned non-impact state, the emission deterioration state does not occur even if the actual injection time number is smaller than the target injection time number. Therefore, in the present embodiment, while the lighting of the warning light 17 is allowed when the operation state is the impact state, the lighting of the warning light 17 is prohibited when the operation state is the non-impact state even if the actual injection time number is smaller than the target injection time number.

Thus, according to the present embodiment, when the operation state is the non-impact state (S10: NO), the lighting of the warning light 17 is prohibited (S90) irrespective of whether the actual injection timing number is smaller than the target injection time number or not. When the operation state is the impact state (S10: YES), the warning light 17 is lit (S70) on the condition that the actual injection time number is smaller than the target injection time number. Thus, the deterioration of the exhaust emission can be informed appropriately.

(Third Embodiment)

Next, a third embodiment of the present invention will be described. In the above-described first embodiment, the lighting of the warning light 17 is prohibited unconditionally if the operation state is the non-impact state. In the present embodiment, when the operation state is the impact state, the lighting of the warning light 17 is allowed on a condition that the injection timing deviation amount ≥a first determination threshold value TH1. When the operation state is the non-impact state, the lighting of the warning light 17 is allowed on a condition that the injection timing deviation amount ≥a second determination threshold value TH2. The second determination threshold value TH2 is set at a larger value than the first determination threshold value TH1. In short, it is determined whether the emission deterioration state exists even when the operation state is the non-impact state. By setting the second determination threshold value TH2 larger than the first determination threshold value TH1, possibility of the determination that the emission deterioration state exists is lowered in the case of the non-impact state as compared to the case of the impact state.

Figure 6:
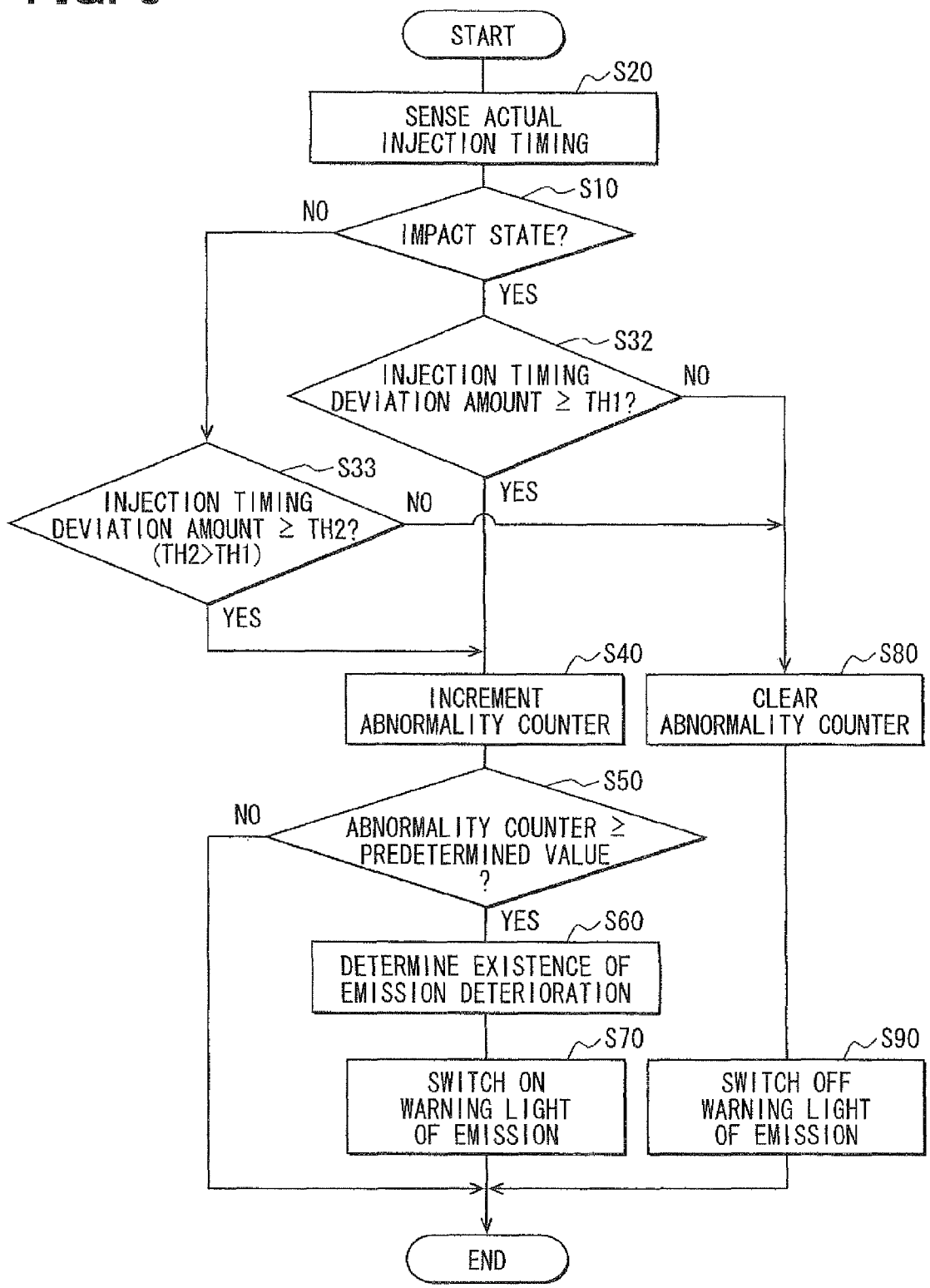
FIG. 6 is a flowchart showing a control procedure of a warning light of emission according to a third embodiment of the present invention.

FIG. 6 is a flowchart showing a procedure for controlling the operation of the warning light 17 according to the present embodiment. In short, S30 of FIG. 4 is changed into S32 and S33 of FIG. 6. The sensing processing of the actual injection timing in S20 is performed irrespective of the determination result about whether the operation state is the impact state or not. That is, the sensing processing of the actual injection timing is performed in S20 first, and then it is determined whether the operation state is the impact state in S10.

When it is determined that the operation state is the impact state (310: YES), it is determined in following S32 whether the injection timing deviation amount is "equal to or larger than" the first determination threshold value TH1. Each time it is determined that the injection timing deviation amount ≥TH1 (S32: YES), the abnormality counter is incremented by one in following S40. When it is determined that the operation state is the non-impact state (S10: NO), it is determined in following S33 whether the injection timing deviation amount is "equal to or larger than" the second determination threshold value TH2. Each time it is determined that the injection timing deviation amount ≥TH2 (S33: YES), the abnormality counter is incremented by one in following S40. The second determination threshold value TH2 is set at a larger value than the first determination threshold value TH1. It is determined that the emission deterioration state exists on a condition that the state where the injection timing deviation amount ≥TH1 (or TH2) continues for a predetermined time or longer.

If it is determined that the injection timing deviation amount <TH1 (S32: NO) or the injection timing deviation amount <TH2 (S33: NO), the value of the abnormality counter is reset to zero in following S80. Further, the operation of the warning light 17 is controlled to switch off the warning light 17 in following S90.

Thus, according to the present embodiment, when it is determined whether the emission deterioration state exists based on the injection timing deviation amount, the determination threshold value TH2 during the non-impact state is set larger than the determination threshold value TH1 during the impact state to reduce the likeliness of the determination that the emission deterioration state exists during the non-impact state. Thus, the deterioration of the exhaust emission can be informed appropriately such that the unnecessary lighting of the warning light 17 is suppressed and the information of the emission deterioration state is limited to the necessary minimum.

(Other Embodiments)

The present invention is not limited to the above-described embodiments but may be modified and implemented as follows, for example. Further, characteristic constructions of the respective embodiments may be combined arbitrarily.

In S31 of FIG. 5 according to the above-described second embodiment, it is determined that the emission deterioration state exists on the condition that the actual injection time number is smaller than the target injection time number. Alternatively, it may be determined that the emission deterioration state exists on a condition that the actual injection time number is smaller than the target injection time number by at least a predetermined amount (i.e., determination threshold value THa).

In this case, the concept of S32, S33 of the above-described third embodiment may be applied to the second embodiment such that the determination of whether the emission deterioration state exists or not is performed in both cases of the impact state and the non-impact state. The determination threshold value THa used for the determination during the non-impact state may be set at a larger value than the determination threshold value THa used for the determination during the impact state.

If it is determined that the operation state is the impact state when the cylinder temperature is lower than the predetermined temperature in the processing of S10 for determining whether the operation state is the impact state, the predetermined temperature used for the determination may be set variably according to the engine rotation speed, the engine load, the fuel temperature and the like at the time. For example, even if the cylinder temperature is the same, the combustion state stabilizes more and becomes less affected by the injection timing deviation as the engine rotation speed increases, as the engine load increases, or as the fuel temperature increases. Therefore, it is preferable to set the predetermined temperature lower as the engine rotation speed, the engine load or the fuel temperature increases.

It is desirable to prohibit lighting of the warning light 17 when temperature of a component part of the ECU 20 (e.g., CPU 21 or pulse output circuit 22) or a component part of the EDU 30 (e.g., switching elements SW1, SW2, SW3, converter 31, boosting capacitor 32 or control circuit 33) is outside an operation-guaranteed temperature range. More specifically, the lighting of the warning light 17 may be prohibited when atmospheric temperature of the ECU 20 or the EDU 30 goes out of a preset temperature range.

In the above-described embodiments, the warning light 17 (display section) is used as the emission deterioration informing section, but the present invention is not limited thereto. Alternatively, for example, a buzzer or the like for generating a warning sound may be used as the emission deterioration informing section. A section for outputting a diagnostic signal without lighting the warning light 17 or generating the warning sound may be used as the emission deterioration informing section. It is desirable to arrange the warning light 17 in a position, from which the warning can be informed to the vehicle driver. For example, it is desirable to attach the warning light 17 to an instrument panel or a meter device inside a vehicle compartment.

In the above-described embodiments, the emission deterioration determining section for determining that the emission deterioration state exists on the condition that the injection timing deviation amount is equal to or larger than the predetermined threshold value TH (S30: YES). Further, an abnormality determining section for determining whether the injection timing deviation amount increases and exceeds an upper limit value due to an abnormality in a fuel injection system such as an abnormality in a component part of the injector 12 may be provided separately from the above-mentioned emission deterioration determining section. In this case, the above-mentioned threshold values TH, TH1, TH2 used for the emission deterioration determination may be set at smaller values than the above-mentioned upper limit value used for the abnormality determination or at larger values than the upper limit value used for the abnormality determination. When existence of the abnormality is determined, a diagnostic signal indicating the existence of the abnormality in the fuel injection system may be outputted, for example.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An emission deterioration informing device applied to a direct injection internal combustion engine, which injects fuel from an injector directly into a combustion chamber and which is a spark ignition internal combustion engine, the emission deterioration informing device comprising:
    an actual injection timing sensing means for sensing actual injection timing, at which the fuel injection is actually performed from the injector;
    a deviation amount calculating means for calculating a deviation amount of the sensed actual injection timing from target injection timing;
    an emission deterioration informing means for informing deterioration of exhaust emission when the calculated deviation amount is larger than a predetermined threshold value; and
    an impact state determining means for determining whether an operation state of the internal combustion engine is an impact state, in which the exhaust emission receives a predetermined influence or more from the deviation of the actual injection timing from the target injection timing, wherein
    the emission deterioration informing device is configured to allow the information by the emission deterioration informing means when the operation state is determined to be the impact state, and
    the emission deterioration informing device is configured to prohibit the information by the emission deterioration informing means when the operation state is not determined to be the impact state.

2. The emission deterioration informing device as in claim 1, wherein
    the impact state determining means determines that the operation state is the impact state on a condition that fuel is injected during a compression stroke of the internal combustion engine.

3. The emission deterioration informing device as in claim 1, wherein
    the impact state determining means determines that the operation state is the impact state on a condition that temperature of a cylinder of the internal combustion engine is lower than a predetermined temperature.

4. The emission deterioration informing device as in claim 1, wherein
    the emission deterioration informing device is applied to the internal combustion engine having a catalytic device for purifying exhaust gas, and
    the impact state determining means determines that the operation state is the impact state on a condition that temperature of the catalytic device has not reached catalyst activation temperature and catalyst warm-up operation is being performed.

5. The emission deterioration informing device as in claim 1, wherein
    the emission deterioration informing device is applied to a fuel injection system having an injection commanding means for outputting an injection command signal corresponding to target injection quantity and target injection timing and a drive circuit for controlling a drive voltage or a drive current supplied to the injector based on the injection command signal, and
    the actual injection timing sensing means senses the actual injection timing based on the drive voltage or the drive current controlled by the drive circuit.

6. The emission deterioration informing device as in claim 1, wherein
    the emission deterioration informing device is applied to a fuel injection system having an injection commanding means for outputting an injection command signal corresponding to target injection quantity and target injection timing and a drive circuit for controlling a drive voltage or a drive current supplied to the injector based on the injection command signal, and
    the emission deterioration informing device is configured to prohibit the information by the emission deterioration informing means when temperature of an electronic component constituting the injection commanding means or an electronic component constituting the drive circuit is outside an operation-guaranteed temperature range.

7. An emission deterioration informing device applied to a direct injection internal combustion engine, which injects fuel from an injector directly into a combustion chamber and which is a spark ignition internal combustion engine, the emission deterioration informing device comprising:
    an actual injection timing sensing means for sensing actual injection timing, at which the fuel injection is actually performed from the injector;
    a deviation amount calculating means for calculating a deviation amount of the sensed actual injection timing from target injection timing;
    an emission deterioration informing means for informing deterioration of exhaust emission when the deviation amount is larger than a predetermined threshold value; and
    an impact state determining means for determining whether an operation state of the internal combustion engine is an impact state, in which the exhaust emission receives a predetermined influence or more from the deviation of the actual injection timing from the target injection timing, wherein
    the emission deterioration informing device is configured to set the threshold value at a larger value in the case where the operation state is not determined to be the impact state than in the case where the operation state is determined to be the impact state.

8. The emission deterioration informing device as in claim 7, wherein
the impact state determining means determines that the operation state is the impact state on a condition that fuel is injected during a compression stroke of the internal combustion engine.

9. The emission deterioration informing device as in claim 7, wherein
the impact state determining means determines that the operation state is the impact state on a condition that temperature of a cylinder of the internal combustion engine is lower than a predetermined temperature.

10. The emission deterioration informing device as in claim 7, wherein
the emission deterioration informing device is applied to the internal combustion engine having a catalytic device for purifying exhaust gas, and
the impact state determining means determines that the operation state is the impact state on a condition that temperature of the catalytic device has not reached catalyst activation temperature and catalyst warm-up operation is being performed.

11. The emission deterioration informing device as in claim 7, wherein
the emission deterioration informing device is applied to a fuel injection system having an injection commanding means for outputting an injection command signal corresponding to target injection quantity and target injection timing and a drive circuit for controlling a drive voltage or a drive current supplied to the injector based on the injection command signal, and
the actual injection timing sensing means senses the actual injection timing based on the drive voltage or the drive current controlled by the drive circuit, 12. The emission deterioration informing device as in claim 7, wherein
the emission deterioration informing device is applied to a fuel injection system having an injection commanding means for outputting an injection command signal corresponding to target injection quantity and target injection timing and a drive circuit for controlling a drive voltage or a drive current supplied to the injector based on the injection command signal, and
the emission deterioration informing device is configured to prohibit the information by the emission deterioration informing means when temperature of an electronic component constituting the injection commanding means or an electronic component constituting the drive circuit is outside an operation-guaranteed temperature range.

13. An emission deterioration informing device applied to a direct injection internal combustion engine, which injects fuel from an injector directly into a combustion chamber and which is a spark ignition internal combustion engine, the emission deterioration informing device comprising:
an actual injection time number sensing means for sensing an actual injection time number of split injections when the fuel injection in a combustion cycle of the internal combustion engine is performed as a plurality of split injections;
an emission deterioration informing means for informing deterioration of exhaust emission when the sensed actual injection time number is smaller than a target injection time number; and
an impact state determining means for determining whether an operation state of the internal combustion engine is an impact state, in which the exhaust emission receives a predetermined influence or more because the actual injection time number is smaller than the target injection time number, wherein
the emission deterioration informing device is configured to allow the information by the emission deterioration informing means when the operation state is determined to be the impact state, and
the emission deterioration informing device is configured to prohibit the information by the emission deterioration informing means when the operation state is not determined to be the impact state.

14. The emission deterioration informing device as in claim 13, wherein
the impact state determining means determines that the operation state is the impact state on a condition that fuel is injected during a compression stroke of the internal combustion engine.

15. The emission deterioration informing device as in claim 13, wherein
the impact state determining means determines that the operation state is the impact state on a condition that temperature of a cylinder of the internal combustion engine is lower than a predetermined temperature.

16. The emission deterioration informing device as in claim 13, wherein
the emission deterioration informing device is applied to the internal combustion engine having a catalytic device for purifying exhaust gas, and
the impact state determining means determines that the operation state is the impact state on a condition that temperature of the catalytic device has not reached catalyst activation temperature and catalyst warm-up operation is being performed.

17. The emission deterioration informing device as in claim 13, wherein
the emission deterioration informing device is applied to a fuel injection system having an injection commanding means for outputting an injection command signal corresponding to target injection quantity and target injection timing and a drive circuit for controlling a drive voltage or a drive current supplied to the injector based on the injection command signal, and
the actual injection time number sensing means senses the actual injection time number based on the drive voltage or the drive current controlled by the drive circuit.

18. The emission deterioration informing device as in claim 13, wherein
the emission deterioration informing device is applied to a fuel injection system having an injection commanding means for outputting an injection command signal corresponding to target injection quantity and target injection timing and a drive circuit for controlling a drive voltage or a drive current supplied to the injector based on the injection command signal, and
the emission deterioration informing device is configured to prohibit the information by the emission deterioration informing means when temperature of an electronic component constituting the injection commanding means or an electronic component constituting the drive circuit is outside an operation-guaranteed temperature range.

* * * * *